(12) United States Patent  (10) Patent No.: US 9,712,813 B2
Leng                       (45) Date of Patent:     Jul. 18, 2017

(54) DISPLAY SYSTEM AND CONTROL METHOD THEREOF

(71) Applicant: BOE TECHNOLOGY GROUP CO., LTD., Beijing (CN)

(72) Inventor: Changlin Leng, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 119 days.

(21) Appl. No.: 14/646,175

(22) PCT Filed: Sep. 30, 2014

(86) PCT No.: PCT/CN2014/087924
§ 371 (c)(1),
(2) Date: May 20, 2015

(87) PCT Pub. No.: WO2015/196615
PCT Pub. Date: Dec. 30, 2015

(65) Prior Publication Data
US 2016/0182900 A1    Jun. 23, 2016

(30) Foreign Application Priority Data
Jun. 23, 2014 (CN) .......................... 2014 1 0283117

(51) Int. Cl.
H04N 7/18       (2006.01)
H04N 13/04      (2006.01)
(Continued)

(52) U.S. Cl.
CPC ......... H04N 13/0497 (2013.01); G09G 3/003 (2013.01); G09G 3/20 (2013.01);
(Continued)

(58) Field of Classification Search
CPC ................................. H04N 5/64; H04N 5/655
(Continued)

(56) References Cited

U.S. PATENT DOCUMENTS 8,958,026 B2    2/2015  Park et al.
2003/0219146 A1  11/2003 Jepson et al.
(Continued)

FOREIGN PATENT DOCUMENTS

CN    101216635 A    7/2008
CN    102223564 A    10/2011
(Continued)

OTHER PUBLICATIONS

International Search Report of the International Searching Authority for PCT/CN2014/087924 mailed on Mar. 23, 2015 in Chinese.
Written Opinion of the International Searching Authority for PCT/CN2014/087924 mailed on Mar. 23, 2015 in Chinese with an English translation.
(Continued)

Primary Examiner — Andy Rao
(74) Attorney, Agent, or Firm — Collard & Roe, P.C.

(57) ABSTRACT

Disclosed are a display system and a control method for the same. The display system includes a display means (1), an image input means (2), a depth of field analysis means (3) and a bending degree control means (4). The image input means (2) inputs the images to the depth of field analysis means; the depth of field analysis means (3) analyzes the depth of field of the images; the bending degree control means (4) controls the bending degree of the display means according to the depth of field of the images; the display means (1) displays the images. The display system and the control method thereof can adapt to the images with different depth of field, thus observer's visual experience is improved.

12 Claims, 2 Drawing Sheets

(51) Int. Cl.
  *G09G 3/20*   (2006.01)
  *H04N 13/00*  (2006.01)
  *H04N 13/02*  (2006.01)
  *G09G 3/00*   (2006.01)

(52) U.S. Cl.
  CPC ..... *H04N 13/0022* (2013.01); *H04N 13/0285* (2013.01); *H04N 13/042* (2013.01); *G09G 2380/02* (2013.01); *H04N 13/0452* (2013.01); *H04N 2013/0081* (2013.01)

(58) Field of Classification Search
  USPC .................................. 348/36–39, 42–60, 839
  See application file for complete search history.

(56) References Cited

U.S. PATENT DOCUMENTS

| | | | |
|---|---|---|---|
| 2013/0148859 A1 | 6/2013 | Inoue et al. | |
| 2014/0168211 A1 | 6/2014 | Kawada et al. | |
| 2015/0029381 A1* | 1/2015 | Kang | H04N 5/23216 348/333.01 |

FOREIGN PATENT DOCUMENTS

| | | | |
|---|---|---|---|
| CN | 103069814 A | 4/2013 | |
| CN | 103489380 A | 1/2014 | |
| CN | 103843335 A1 | 6/2014 | |

OTHER PUBLICATIONS

English Translation of Written Opinion of the International Searching Authority for PCT/CN2014/087924 mailed on Mar. 23, 2015.

\* cited by examiner

DISPLAY SYSTEM AND CONTROL METHOD THEREOF

CROSS REFERENCE TO RELATED APPLICATIONS

This application is the National Stage of PCT/CN2014/087924 filed on Sep. 30, 2014, which claims priority under 35 U.S.C. §119 of Chinese Application No. 201410283117.5 filed on Jun. 23, 2014, the disclosure of which is incorporated by reference.

TECHNICAL FIELD

Embodiments of the present invention relate to a display system and a control method for the same.

BACKGROUND

Display devices are used for displaying images, different images generally have different depth of field. Exemplarily, when images include background and content, images with blur background and clear object have small depth of field, images with clear background and clear object have large depth of field, besides, there are some images between large and small depth of field.

Currently, flat panel displays and curved displays are used commonly; the display effect of the flat panel display is poor, when displaying images with different depth of field. The curved surface picture which displayed by the curved display is fixed, it has a better display effect only for images with specific depth of field.

The inventor found that the traditional display device can not adapt well to the images with different depth of field, so observer's visual experience is poor.

SUMMARY

In first respect of the present invention, there is provided a display system, which comprises: a display means, an image input means, a depth of field analysis means and a bending degree control means; wherein the image input means is configured to input an image to the depth of field analysis means; the depth of field analysis means is configured to analyze an depth of field of the image; the bending degree control means is configured to control a bending degree of the display means according to the depth of field of the image; the display means is configured to display the image.

As an example, the analysis of the image's depth of field comprises analyzing an average value of depth of field of multiple images in a preset time; the bending degree control means is configured to control the bending degree of the display means by stages according to the average value.

As an example, the bending degree control means comprises a depth of field conversion unit and a display adjustable control unit, the depth of field conversion unit is configured to convert the depth of field of the image which is obtained from the depth of field analysis means into an adjustable information; the display adjustable control unit is configured to control the bending degree of the display means according to the adjustable information.

As an example, the display system further comprises an image buffer means, the image buffer means is configured to buffer the image which input from the image input means for a period of time.

As an example, the analysis of the image's depth of field further comprises: extracting the image buffered in the image buffer means to analyze the depth of field of the image, and estimating a display mode of the display system.

As an example, the display means comprises a display screen, a maximal bending degree of the display screen d=D(1−cos a)/cos a, wherein, D is a distance between the display screen and the eye, a is an effective viewing angle of the eye, a is more than or equal to 28° and less than or equal to 50°.

As an example, H is a height of the display screen, the distance between the display screen and the eye D=2.5H.

In second respect of the present invention, there is provided a display system, which comprises: a display means, an image input means, a depth of field analysis means and a bending degree control means. In the displaying process of the display system, the image input means inputs the images to the depth of field analysis means, the depth of field analysis means analyzes the depth of field of the images, the bending degree control means controls the bending degree of the display means according to the depth of field of the images, and the display means displays the images, then the display system can adapt to the images with different depth of field, and observer's visual experience is improved.

In third respect of the present invention, there is provided a control method for the display system, which comprises:

inputting an image through an image input means;

analyzing the image's depth of field through a depth of field analysis means;

controlling a bending degree of a display means according to the depth of field of the image through a bending degree control means;

displaying the image through a display means.

As an example, the step of analyzing the image's depth of field through a depth of field analysis means comprises: analyzing an average value of the depth of field of multiple images in a preset time; the bending degree control means controls the bending degree of the display means by stags according to the average value.

As an example, the step of controlling a bending degree of a display means according to the depth of field of the image through a bending degree control means comprises: converting the depth of field of the image which is obtained from the depth of field analysis means to an adjustable information through a depth of field conversion unit; controlling the bending degree of the display means according to the adjustable information through a display adjustable control unit.

As an example, the control method for the display system further comprises: buffering the image which is input through the image input means for a period time in an image buffer means.

As an example, the step of analyzing the image's depth of field through a depth of field analysis means further comprises: extracting the image buffered in the image buffer means to analyze the depth of field of the image, and estimating a display mode of the display system.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

Reference signs: 1—display means; 11—display screen; 2—image input means; 3—depth of field analysis means; 4—bending degree control means; 41—depth of field conversion unit; 42—display adjustable control unit; 421—fixed backboard; 422—adjustable bolt; 423—adjustable bolt control mechanism; 5—image buffer means.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiments, without any inventive work, which should be within the scope of the invention.

Embodiment 1

Embodiments of the present invention provide a display system, the display system can adapt to the images with different depth of field, and observer's visual experience can be improved.

Figure 1:
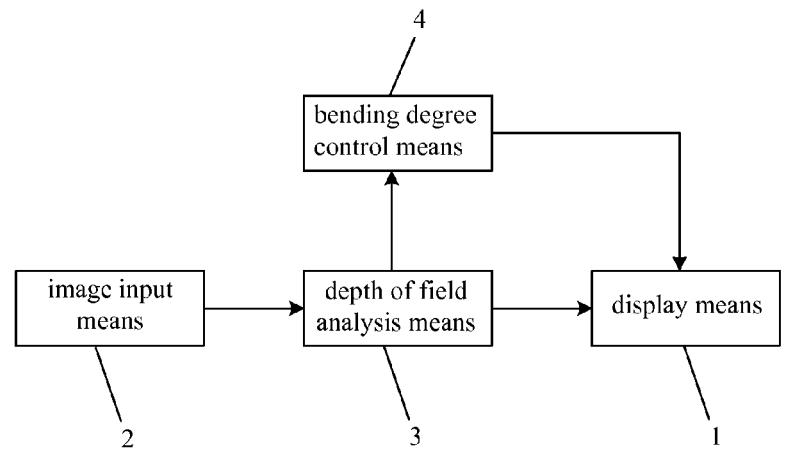
FIG. 1 schematically illustrates a display system according to an embodiment of the present invention.

For example, as shown in FIG. 1, the display system comprises: a display means 1, an image input means 2, a depth of field analysis means 3 and a bending degree control means 4.

For example, the display means 1 is flexible; the display means may be an OLED display device with a flexible substrate, or a large-size LED display with a glass substrate or a quartz substrate, or a flexible display device. Exemplarily, when the display means 1 is an LED display device with a glass substrate, the display means 1 comprises a backlight module and a display panel, etc. The specific shape of the display means 1 with different bending degree may be plate-plane (unbending), convex, concave, or any combination of the above three shapes.

The image input means 2 inputs the images to the depth of field analysis means 3, for example, the image input means 2 provides the images which corresponding to the display mode of the display system to the depth of field analysis means 3. Herein, the display mode of the display system is 2D or 3D.

The depth of field analysis means 3 analyzes the depth of field of the images, exemplarily, if the image includes an object in the middle and a background in the edge, and the background is blur, and the object is clear, the depth of field analysis means 3 can analyze and conclude that the image has small depth of field, and obtain the accurate depth of field.

The bending degree control means 4 controls the bending degree of the display means 1 according to the depth of field of the images. Exemplarily, if the image includes an object in the middle and a background in the edge, and the background is blur, and the object is clear, the bending degree control means 4 makes the edge of the display means 1 concave or makes the middle of the display means 1 convex according to the depth of field of the image obtained from the depth of field analysis means 3, then observer's visual experience is improved.

Figure 2:
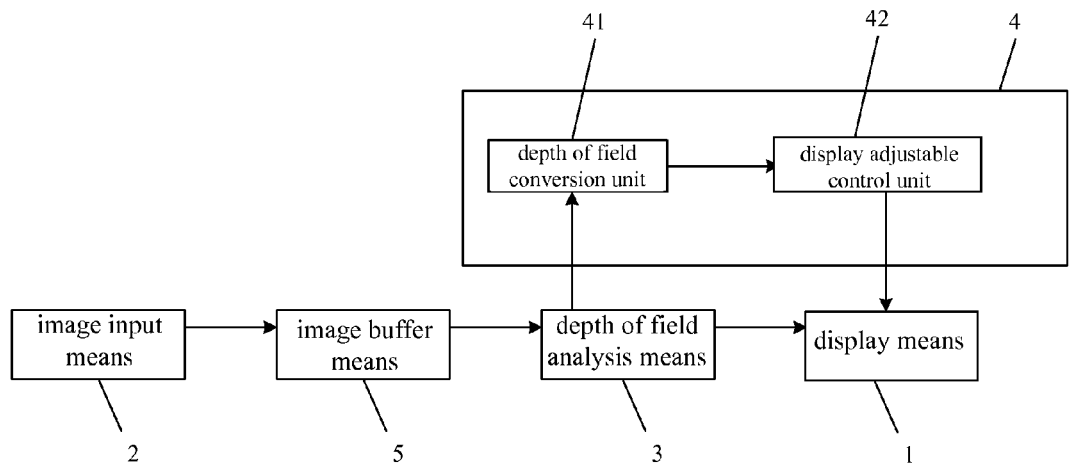
FIG. 2 schematically illustrates another display system according to an embodiment of the present invention.
Figure 3:
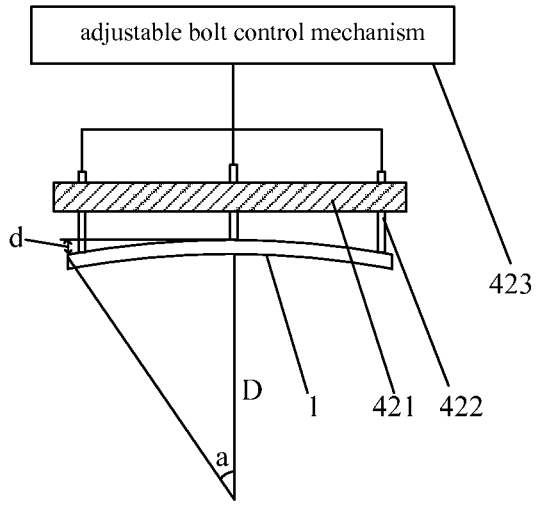
FIG. 3 schematically illustrates a display adjustable control unit and a display means according to embodiments of the present invention.

Exemplarily, as shown in FIG. 2, the bending degree control means 4 comprises a depth of field conversion unit 41 and a display adjustable control unit 42, wherein the depth of field conversion unit 41 converts the depth of field of the image which obtained from the depth of field analysis means 3 into an adjustable information, the display adjustable control unit 42 controls the bending degree of the display means 1 according to the adjustable information. Exemplarily, as shown in FIG. 3, the display adjustable control unit 42 can be implemented by a fixed backboard 421, an adjustable bolt 422 and an adjustable bolt control mechanism 423. For example, a screwed hole corresponding to the adjustable bolt 422 is disposed on the fixed backboard 421, an end of the adjustable bolt 422 is connected adjustably with the fixed backboard 421 through the screwed hole, the other end of the adjustable bolt 422 is connected fixedly with the display means 1. Herein, in case that the adjustable information obtained from the depth of field conversion unit 41 is the moving distance of the adjustable bolt 422, the adjustable bolt control mechanism 423 controls the movement of the adjustable bolt 422 according to the moving distance of the adjustable bolt 422 which obtained from the depth of field conversion unit 41, and then adjusts the position of the adjustable bolt 422 between the display means 1 and the fixed backboard 421, in order to adjust the bending degree of the display means 1. Herein, the fixed backboard 421 is further configured to fix the display system.

The number of the adjustable bolt 422 is at least one. In order to better match the bending degree of the display means 1 with the image's depth of field, preferably, the number of the adjustable bolt 422 is three or more in embodiments of the present invention; in order to adjust the display means 1 at multi-point, the adjustable bolts 422 are arranged in rows, in columns or in a matrix form, such that the bending degree is different at different locations of the display means 1.

As an example, the depth of field analysis means 3 analyzes the average value of depth of field of multiple images in the preset time, the bending degree control means 4 controls the bending degree of the display means 1 according to the average value by stages, then the bending degree of the display means 1 is matched well with the image's depth of field, meanwhile the poor observer's visual experience caused by adjusting the bending degree of the display means 1 too frequently or a sudden bend of the display means 1 can be avoided.

Furthermore, as shown in FIG. 2, the display system further comprises an image buffer means 5, the image buffer means 5 buffers the image which input from the image input means 1 for a period, in order to have more sufficient time to analyze the previous image for the depth of field analysis means 3. The continuity of the displayed images is not affected by the buffer of the image in the image buffer means 5. Herein, the depth of field analysis means 3 extracts the image from the image buffer means 5 and analyzes the depth of field of the image, and then estimates the display mode of the display system, in order to determine whether the different bending degree of the display means 1 is needed or not, according to the observer's personal preference, the display mode, etc. For example, when the display mode is 2D, due to the poor stereoscopic effect of the 2D image, the enhancement effect of observer's visual experience which brought by the bending degree of the display means 1 is less obvious than the enhancement effect in 3D display mode, so observers may choose to adjust the bending degree of the display means 1, and may also choose not to adjust it. When the display mode is 3D, the depth of field analysis means 3 analyzes the depth of field of images respectively viewed by the left eye and the right eye to obtain the depth of field of the 3D image observed by observers, and then adjusts the bending degree of the display means 1, in order to make the images in the effective viewing angle have no stadia difference, and further enhance the 3D stereoscopic effect on the spot.

As an example, as shown in FIG. 3, the display means 1 comprises a display screen 11, the maximal bending degree d of the display screen 11 is: d=D(1−cos a)/cos a, wherein, D is a distance between the display screen 11 and the eye, a is an effective viewing angle of the eye, a is more than or equal to 28° and less than or equal to 50°. Preferably, in order to obtain better visual experience, the distance D between the display screen 11 and the eye is: D=2.5H in embodiments of the present invention, wherein, H (not shown in drawings) is the height of the display screen 11. In this case, the maximal bending degree d of the display screen 11 is: d=2.5H(1−cos a)/cos a, wherein, a is an effective viewing angle of the eye, a is more than or equal to 28° and less than or equal to 50°.

In the displaying process of the display system, the image input means inputs the images to the depth of field analysis means, the depth of field analysis means analyzes the depth of field of the images, the bending degree control means controls the bending degree of the display means according to the depth of field of the images. As a result, the display system can adapt to the images with different depth of field, and observer's visual experience can be improved.

Embodiment 2

Figure 4:
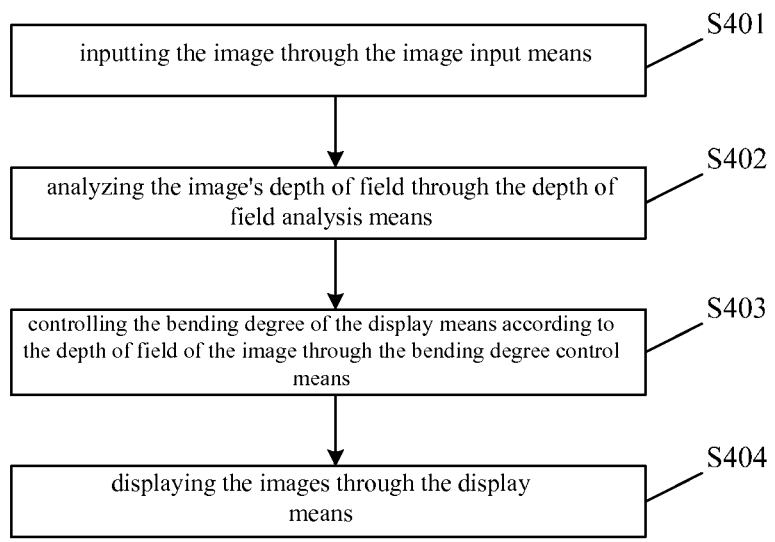
FIG. 4 is a flowchart of a control method for the display system according to an embodiment of the present invention.

Embodiments of the present invention provide a control method for the display system, for example, as shown in FIG. 4, which comprises:

step S401, inputting the image through the image input means;

step S402, analyzing the image's depth of field through the depth of field analysis means;

step S403, controlling the bending degree of the display means according to the depth of field of the image through the bending degree control means;

step S404, displaying the images through the display means.

As an example, the step of analyzing the depth of field of the images through the depth of field analysis means 3 comprises: analyzing the average value of depth of field of multiple images in the preset time; and controlling the bending degree of the display means 1 by stages according to the average value through the bending degree control means 4, as a result, the bending degree of the display means 1 is matched well with the image's depth of field, meanwhile the poor observer's visual experience caused by adjusting the bending degree of the display means 1 too frequently or a sudden bend of the display means 1, etc can be avoided.

As an example, the step of controlling the bending degree of the display means 1 according to the depth of field of the images through the bending degree control means 4 comprises: converting the depth of field of the image which is obtained from the depth of field analysis means 3 into an adjustable information in the depth of field conversion unit 41; and controlling the bending degree of the display means 1 according to the adjustable information through the display adjustable control unit 42.

As an example, the control method for the display system further comprises: buffering the image which is input through the image input means 1 for a period of time in the image buffer means 5. In this case, the step of analyzing the depth of field of the images in the depth of field analysis means 3 further comprises: extracting the image buffered in the image buffer means 5 to analyze the depth of field of the image, and estimating the display mode of the display system, in order to determine whether the different bending degree of the display means 1 is needed or not, according to the observer's personal preference and the display mode, etc.

In the above control method, the image input means inputs the images, the depth of field analysis means analyzes the depth of field of the images, the bending degree control means controls the bending degree of the display means according to the depth of field of the images, the display means displays the images. As a result, the display system can adapt to the images with different depth of field, and observer's visual experience can be improved.

What is described above is related to the illustrative embodiments of the disclosure only and not limitative to the scope of the disclosure; the scopes of the disclosure are defined by the accompanying claims.

The present application claims priority from Chinese patent application No. 201410283117.5 filed on Jun. 23, 2014, the disclosure of which is hereby incorporated by reference herein in its entirety.

The invention claimed is:

1. A display system, comprising: a display means, an image input means, a depth of field analysis means and a bending degree control means; wherein the image input means is configured to input an image to the depth of field analysis means; the depth of field analysis means is configured to analyze an depth of field of the image; the bending degree control means is configured to control a bending degree of the display means according to the depth of field of the image; the display means is configured to display the image.

2. The display system according to claim 1, wherein the analysis of the image's depth of field comprises analyzing an average value of depth of field of multiple images in a preset time; the bending degree control means is configured to control the bending degree of the display means by stages according to the average value.

3. The display system according to claim 1, wherein the bending degree control means comprises a depth of field conversion unit and a display adjustable control unit, the depth of field conversion unit is configured to convert the depth of field of the image which is obtained from the depth of field analysis means into an adjustable information; the display adjustable control unit is configured to control the bending degree of the display means according to the adjustable information.

4. The display system according to claim 1, further comprising: an image buffer means, the image buffer means is configured to buffer the image which input from the image input means for a period of time.

5. The display system according to claim 4, wherein the analysis of the image's depth of field further comprises: extracting the image buffered in the image buffer means to analyze the depth of field of the image, and estimating a display mode of the display system.

6. The display system according to claim 1, wherein the display means comprises a display screen, a maximal bending degree of the display screen d=D(1−cos a)/cos a, wherein, D is a distance between the display screen and an eye, a is an effective viewing angle of the eye, a is more than or equal to 28° and less than or equal to 50°.

7. The display system according to claim 6, wherein H is a height of the display screen, the distance between the display screen and the eye D=2.5H.

8. A control method for a display system, comprising:
inputting an image;
analyzing the image's depth of field;
controlling a bending degree of a display means according to the depth of field of the image;
displaying the image.

9. The control method for the display system according to claim 8, wherein the step of analyzing the image's depth of field comprises: analyzing an average value of the depth of field of multiple images in a preset time; the bending degree control means controls the bending degree of the display means by stags according to the average value.

10. The control method for the display system according to claim 8, wherein the step of controlling a bending degree of a display means according to the depth of field of the image comprises:
converting the depth of field of the image to an adjustable information;
controlling the bending degree of the display means according to the adjustable information.

11. The control method for the display system according to claim 8, further comprising: buffering the image for a period of time in an image buffer means.

12. The control method for the display system according to claim 11, wherein the step of analyzing the image's depth of field further comprises: extracting the image buffered in the image buffer means to analyze the depth of field of the image, and estimating a display mode of the display system.

* * * * *